United States Patent [19]
Kino et al.

[11] Patent Number: 5,976,053
[45] Date of Patent: Nov. 2, 1999

[54] METHOD OF MANUFACTURING TRACTION ROLLERS FOR CONTINUOUSLY VARIABLE TRANSMISSIONS AND TRACTION ROLLERS RESULTING THEREFROM

[75] Inventors: Nobuo Kino; Shinji Fushimi; Toshifumi Hibi, all of Yokosuka, Japan

[73] Assignee: Nissan Motor Co., Ltd., Yokohama, Japan

[21] Appl. No.: 08/727,037

[22] Filed: Oct. 8, 1996

[30] Foreign Application Priority Data

Oct. 30, 1995 [JP] Japan .................................... 7-281495

[51] Int. Cl.$^6$ .............................. F16H 15/38; F16H 55/32
[52] U.S. Cl. .................................. 476/73; 476/46; 476/72
[58] Field of Search ............................ 492/51, 54, 58; 148/210, 218; 29/898.063, 898.066, 898.12; 384/625, 492, 569; 476/72, 73; 72/356

[56] References Cited

U.S. PATENT DOCUMENTS

| | | | |
|---|---|---|---|
| 1,173,793 | 1/1916 | George | 72/356 |
| 4,997,293 | 3/1991 | Ono | 384/476 |
| 5,516,376 | 5/1996 | Tsukamoto et al. | 148/663 |
| 5,536,091 | 7/1996 | Takata et al. | 384/609 |
| 5,735,769 | 4/1998 | Takemura | 476/40 |
| 5,855,531 | 1/1999 | Mitamura et al. | 476/46 |

FOREIGN PATENT DOCUMENTS

| | | |
|---|---|---|
| 44 18 251 | 1/1994 | Germany . |
| 62-2062 | 1/1987 | Japan . |
| 7-71555 | 3/1995 | Japan . |
| 7-229549 | 8/1995 | Japan . |

*Primary Examiner*—S. Thomas Hughes
*Assistant Examiner*—Steven A Blount
*Attorney, Agent, or Firm*—Foley & Lardner

[57] ABSTRACT

A method of manufacturing a traction roller for a continuously variable transmission comprises placing a layer on a hollow cylindrical material having the volume substantially equal to the traction roller, performing axial pressure forging of the cylindrical material to obtain a work having the axial length substantially equal to that of the traction roller, performing axial die forging of the work to form side wall and outer peripheral surface of the traction roller, and grinding the work subjected to die forging to obtain a finished product of the traction roller.

20 Claims, 5 Drawing Sheets

METHOD OF MANUFACTURING TRACTION ROLLERS FOR CONTINUOUSLY VARIABLE TRANSMISSIONS AND TRACTION ROLLERS RESULTING THEREFROM

BACKGROUND OF THE INVENTION

The present invention relates to a method of manufacturing traction rollers for continuously variable transmissions and traction rollers resulting therefrom.

Various types of continuously variable transmissions have been proposed, one of which is a toroidal-type continuously variable transmission comprising input and output discs and a power roller or traction roller frictionally engaged therewith for ensuring power transmission.

The method of manufacturing power rollers will be described. Conventionally, the detailed method has not been proposed except forming power rollers out of AISI52100 corresponding to JIS SUJ2, high-carbon high-chromium bearing steel or carburizing steel having an effective hardened layer of 2.0–4.0 mm as disclosed in JP-A 7-71555. Ordinarily, the power rollers can be manufactured as follows:

A solid cylindrical material having the same length as the axial length of a power roller is prepared and machined to obtain the final shape, which is subjected first to deep carburizing or carbonitriding of, e.g. 3 mm at 830–960° C., then 840–890° C. during 24–110 hr, and then to hardening. Subsequently, this work is tempered at 170–180° C. during 2–5 hr, and subjected to grinding finishing to obtain a finished product.

However, manufacturing of the power rollers in such a way needs not only a high material cost due to bad material yield, but a lot of time for deep carburizing or carbonitriding. Additionally, a process of deep carburizing or carbonitriding cannot ensure separate treatment of the power roller outer peripheral surface and central axial hole inner peripheral surface which require a thick carburized or carbonitrided layer, and the ball receiving side wall which requires a thin carburized or carbonitrided layer. Moreover, hardened layers formed through the process remain on the finished product without any elimination. These facts can cause the following problems:

When the power roller outer peripheral surface and central axial hole inner peripheral surface, and the ball receiving side wall are treated at the same time, the thickness of the carburized or carbonitrided layer of the ball receiving side wall which may be thin is equal to that of the carburized or carbonitrided layer of the power roller outer peripheral surface and central axial hole inner peripheral surface which is to be thick. Thus, the confluence of the central axial hole inner peripheral surface and the ball receiving side wall which should be the most durable in view of the strength of the power roller is difficult to be formed with a soft core, having considerably lowered durability with respect to crack, resulting in a harmful influence on the durability of the power roller.

Further, due to the fact that any elimination of the hardened layers is not carried out, austenite grains grown through the above process remain on the finished product, resulting in inevitable lowering of the toughness of the hardened layers.

Still further, since machining causes disconnection of a fiber or fabric flow of the solid cylindrical material at the power roller outer peripheral surface and the ball receiving side wall which serve as rolling surfaces of the input and output discs and a ball or rolling element, respectively, the disconnected portion of the fiber flow is apt to be a start point of breakaway and fatigue or impact crack. According to the above method, this problem is aggravated when the austenite grain size is large, i.e. the grading number is 7 or less.

Furthermore, due to the necessity of increasing a duration of carburizing or carbonitriding for the reason as described above, an intergranular oxidizing zone of the confluence of the central axial hole inner peripheral surface and the ball receiving side wall which often causes a crack has a relatively large thickness, which cannot completely be eliminated through the above grinding finishing.

It is, therefore, an object of the present invention to provide a method of manufacturing traction rollers for continuously variable transmissions which contributes to an improvement of the durability of traction rollers.

SUMMARY OF THE INVENTION

According to one aspect of the present invention, there is provided a method of manufacturing a traction roller for a continuously variable transmission, the traction roller being held between input and output discs and rotatably supported by a support member through a pin arranged through a central axial hole of the traction roller, wherein a load input from the traction roller is received by the support member through a rolling element disposed in a side wall of the traction roller located at one end thereof as viewed in an axial direction of the traction roller, the method comprising the steps of:

placing a layer on a cylindrical material having a center hole and a volume substantially equal to the traction roller;

performing a pressure forging of said cylindrical material in an axial direction thereof to obtain a work having an axial length substantially equal to that of the traction roller;

performing a die forging of said work in an axial direction thereof to form the side wall of the traction roller and an outer peripheral surface thereof; and grinding said work subjected to said die forging to obtain a finished product of the traction roller.

Another aspect of the present invention lies in providing a traction roller for a continuously variable transmission, the traction roller being held between input and output discs and rotatably supported by a support member through a pin arranged through a central axial hole of the traction roller, wherein a load input from the traction roller is received by the support member through a rolling element disposed in a side wall of the traction roller located at one end thereof as viewed in an axial direction of the traction roller, the traction roller comprising:

a first layer placed on the side wall of the traction roller, said first layer having a first thickness;

a second layer placed on an inner peripheral surface of the traction roller with respect to the central axial hole, said second layer having a second thickness; and a third layer placed on an outer peripheral surface of the traction roller, said third layer having a third thickness, said first thickness of said first layer being smaller than said second thickness of said second layer whereby a confluence of the side wall of the traction roller and said inner peripheral surface thereof is formed with a soft core.

The other aspect of the present invention lies in providing a traction roller for a continuously variable transmission, the traction roller being held between input and output discs and rotatably supported by a support member through a pin arranged through a central axial hole of the traction roller, wherein a load input from the traction roller is received by the support member through a rolling element disposed in a side wall of the traction roller located at one end thereof as viewed in an axial direction of the traction roller, the traction roller comprising:

first means for covering the side wall of the traction roller, said first means having a first thickness;

second means for covering an inner peripheral surface of the traction roller with respect to the central axial hole, said second means having a second thickness; and third means for covering an outer peripheral surface of the traction roller, said third means having a third thickness, said first thickness of said first means being smaller than said second thickness of said second means whereby a confluence of the side wall of the traction roller and said inner peripheral surface thereof is formed with a soft core.

DETAILED DESCRIPTION OF THE INVENTION

Figure 1:
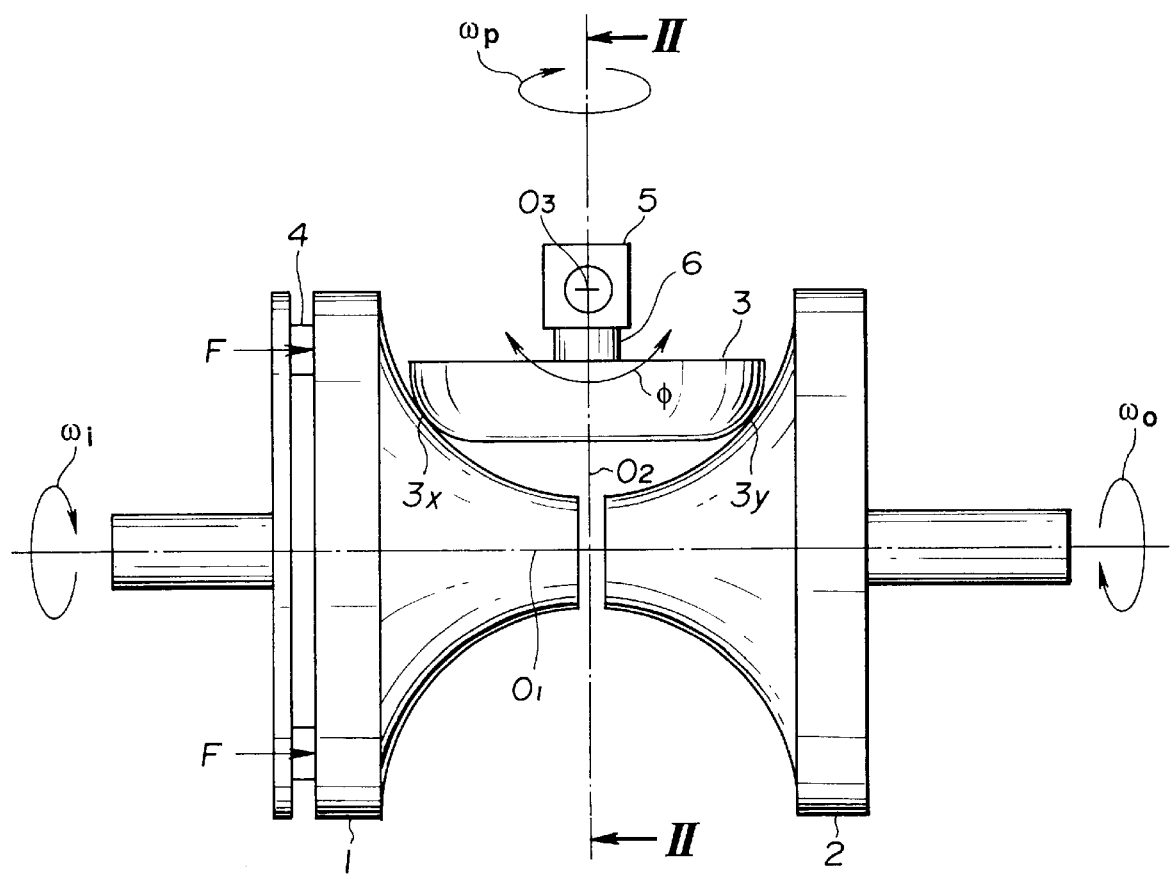
FIG. 1 is a diagrammatic view showing a toroidal-type continuously variable transmission to which the present invention is applied.

Referring to FIG. 1, a toroidal-type continuously variable transmission to which the present invention is applied comprises input and output discs 1, 2 and a power roller or traction roller 3 frictionally engaged therewith for ensuring power transmission.

The input disc 1 receives rotation through a loading cam 4 which gives then a thrust F to the input disc 1 in accordance with transmission input torque. Thus, the power roller 3 is held between the input and output discs 1, 2 by a force in accordance with transmission input torque, ensuring power transmission between the input and output discs 1, 2 through shearing of oil films at points of contact 3x, 3y of the power roller 3 and the input and output discs 1, 2.

Specifically, a rotation $\omega_i$ of the input disc 1 is transmitted to the power roller 3 through shearing of the oil films. Then, a rotation $\omega_p$ of the power roller 3 is transmitted to the output disc 2 through shearing of the oil films to produce a rotation $\omega_o$ of the output disc 2. Likewise, power transmission of the output disc 2 to the input disc 1 is ensured through the power roller 3.

The power roller 3 is rotatably supported on a trunnion 5 as a power roller support member through a pivot pin 6. The trunnion 5 is disposed in a plane perpendicular to a rotation axis $o_1$ of the input and output discs 1, 2 and bisecting the distance therebetween. The trunnion 5 is slantingly rotatable together with the power roller 3 about an oscillating axis $o_3$ perpendicular to a power roller rotation axis $o_2$ as shown by φ, which ensures a continuous change of the diameter of a circle of locus formed by the power roller 3 contacting the input and output discs 1, 2, enabling continuous shifting.

Figure 2:
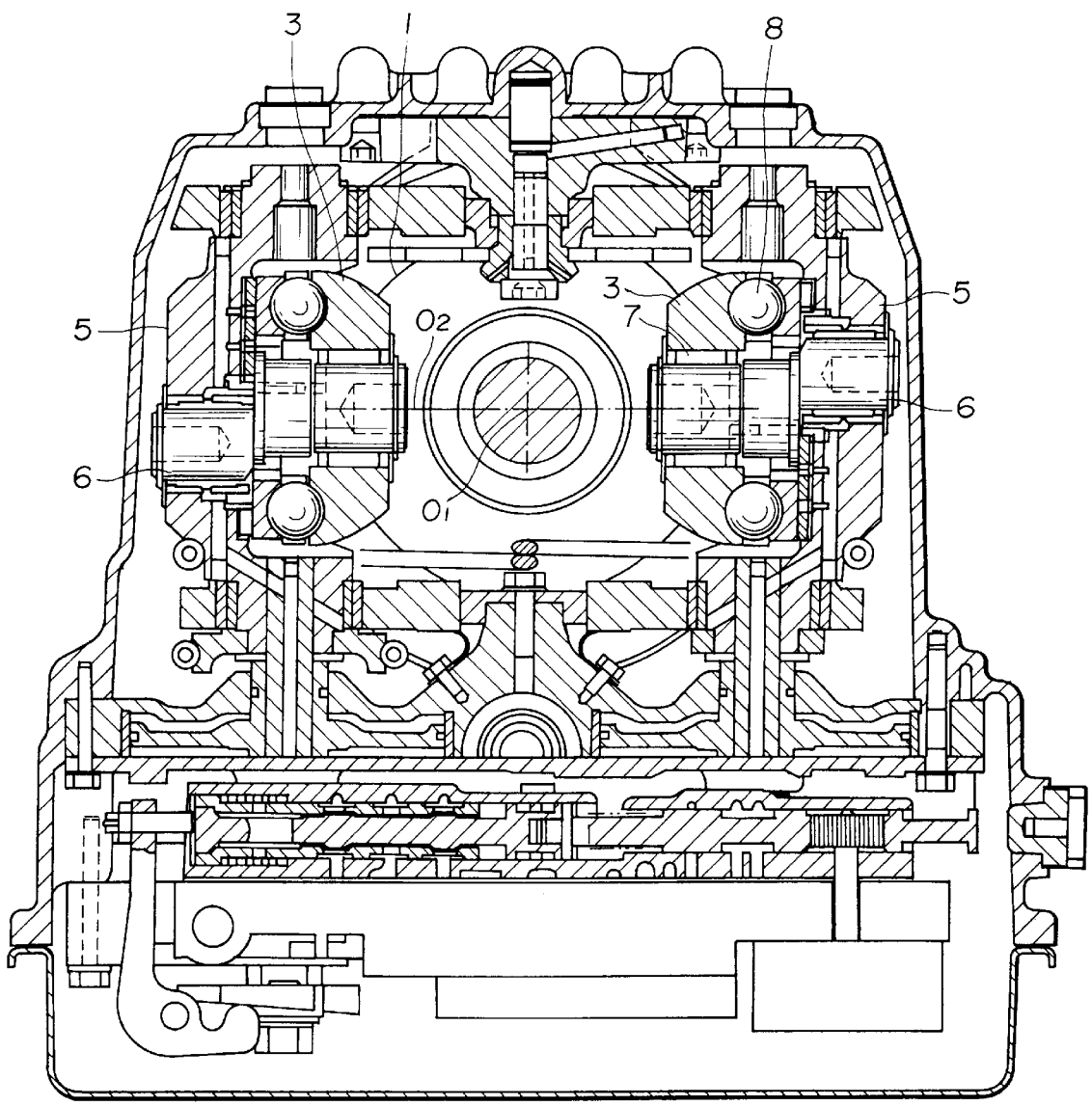
FIG. 2 is a longitudinal section taken along the line II—II in FIG. 1.

Referring to FIG. 2, the power roller 3 and its support structure will be described in detail. In the same way as in JP-A 62-2062, the power roller 3 is rotatably supported to the pivot pin 6 on the trunnion 5 through a radial bearing 7, and is also supported in the direction of the power roller rotation axis $o_2$ by the trunnion 5 through a ball 8 as a rolling element so as to sustain a load input from the input and output discs 1, 2 in accordance with the thrust or holding force F as shown in FIG. 1.

Referring to FIGS. 3A–3H, the process of manufacturing the power roller 3 according to the present invention will be described. First, referring to FIG. 3A, a cylindrical material 21 with a center hole 21a is prepared, which is made of, e.g. a carburizing steel as shown in JP-A 7-71555, p. 4, Table 1, and has a fiber or fabric flow 21b which extends axially along the outer peripheral surface, then radially inwardly along an end face 21c without a break. The volume of the cylindrical material 21 expressed by the product of its axial length and diameter is substantially equal to that of the power roller 3.

Figure 3A:
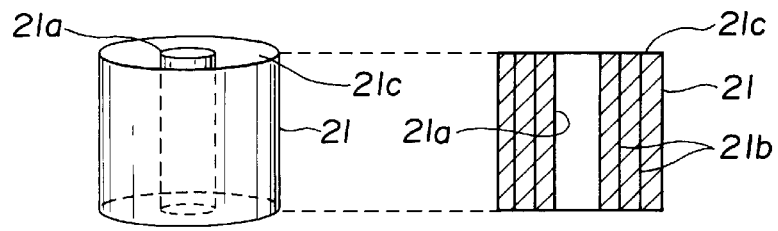
FIG. 3A is a perspective view, with a fiber flow diagram, showing a hollow cylindrical material of a power roller.
Figure 3B:
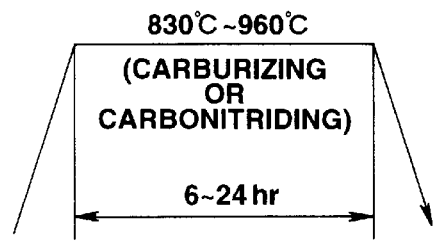
FIG. 3B is a time chart illustrating carburizing or carbonitriding of the material.
Figure 3C:
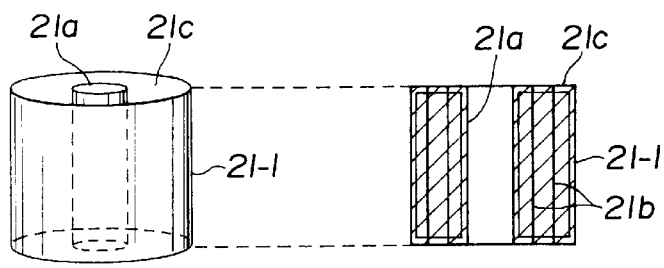
FIG. 3C is a view similar to FIG. 3A, showing the material after carburizing or carbonitriding.
Figure 3D:
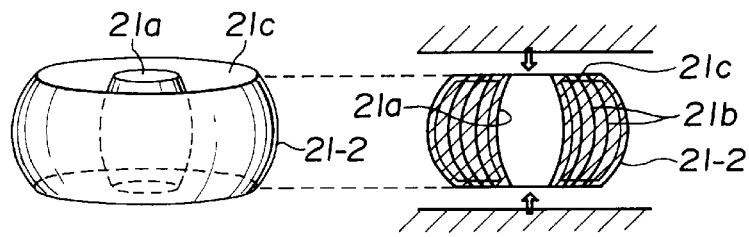
FIG. 3D is a view similar to FIG. 3C, showing the material subjected to pressure forging.

Next, referring to FIG. 3B, the cylindrical material 21 is subjected to thin carburizing or carbonitriding at 830–960° C. during 6–21 hr. Through this process, all the surface of the cylindrical material 21 is covered with a thin uniform carburized or carbonitrided layer of, e.g. 1–2 mm, obtaining a work 21-1 as shown in FIG. 3C. Referring to FIG. 3D, the work 21-1 is subjected to pressure forging several times in the axial direction thereof to obtain a work 21-2 having the axial length substantially equal to that of the power roller 3.

Figure 3E:
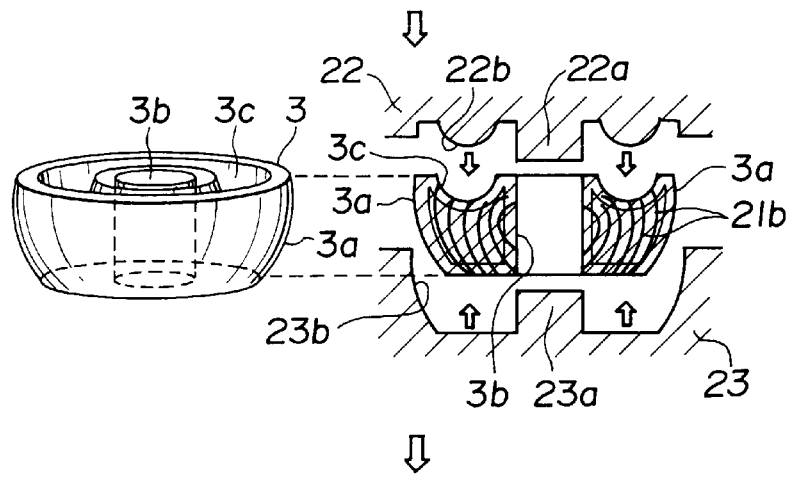
FIG. 3E is a view similar to FIG. 3D, showing the material subjected to die forging.

Referring to FIG. 3E, the work 21-2 is coaxially held between an upper die 22 and a lower die 23, wherein the work end face 21c faces the upper die 22, and another work end face faces the lower die 23. The upper die 22 includes a center protrusion 22a for forming an upper half of the power roller central axial hole 3 by entering the cylindrical material center hole 21a, and an annular protrusion 22b for forming a power roller side wall 3c for receiving the ball 8 (see FIG. 2). The lower die 23 includes a center protrusion 23a for forming an lower half of the power roller central axial hole 3 by entering the cylindrical material center hole 21a, and a curved inner peripheral surface 23b for forming a power roller outer peripheral surface 3a. The upper die 22 and the lower die 23 are moved to approach each other for die forging, obtaining the power roller 3 having the final shape as shown in FIG. 3E.

Figure 3F:
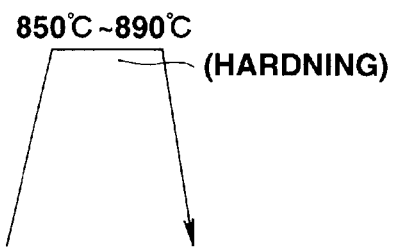
FIG. 3F is a view similar to FIG. 3B, illustrating hardening of the material.
Figure 3G:
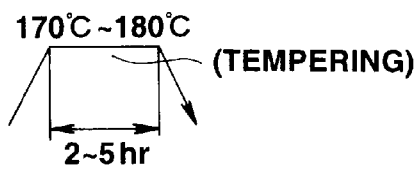
FIG. 3G is a view similar to FIG. 3F, illustrating tempering of the material.
Figure 3H:
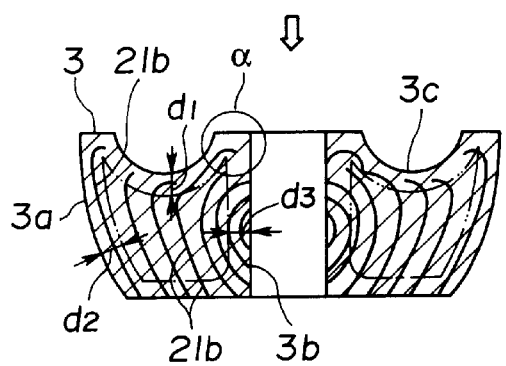
FIG. 3H is a longitudinal section showing a finished product of a power roller.

Referring to FIG. 3H, axial pressure forging and die forging of the work as shown in FIGS. 3D and 3E contribute to a decrease in a thickness $d_1$ of a portion of the above carburized or carbonitrided layer on the ball receiving side wall 3c extending radially, which corresponds, e.g. to 1–2 mm. On the other hand, those forgings contribute to an increase in thicknesses $d_2, d_3$ of portions of the above carburized or carbonitriding layer on the power roller outer peripheral surface 3a and central axial hole inner peripheral surface 3b extending axially, which correspond, e.g. to 2–4 mm.

Referring to FIG. 3F, the power roller 3 subjected to die forging as shown in FIG. 3E is hardened through heating at 850–890° C. and quick quenching. Then, referring to FIG. 3G, the power roller 3 is tempered at 170–180° C. during 2–5 hr, which is subjected to grinding finishing as shown in FIG. 3H, obtaining a finished product of the power roller 3.

The operation and effect of this embodiment will be described.

The method of manufacturing power rollers according to the present invention presents largely improved material yield as compared with the method relying upon machining of power rollers, resulting in decreased manufacturing cost and increased manufacturing reliability.

Figure 4:
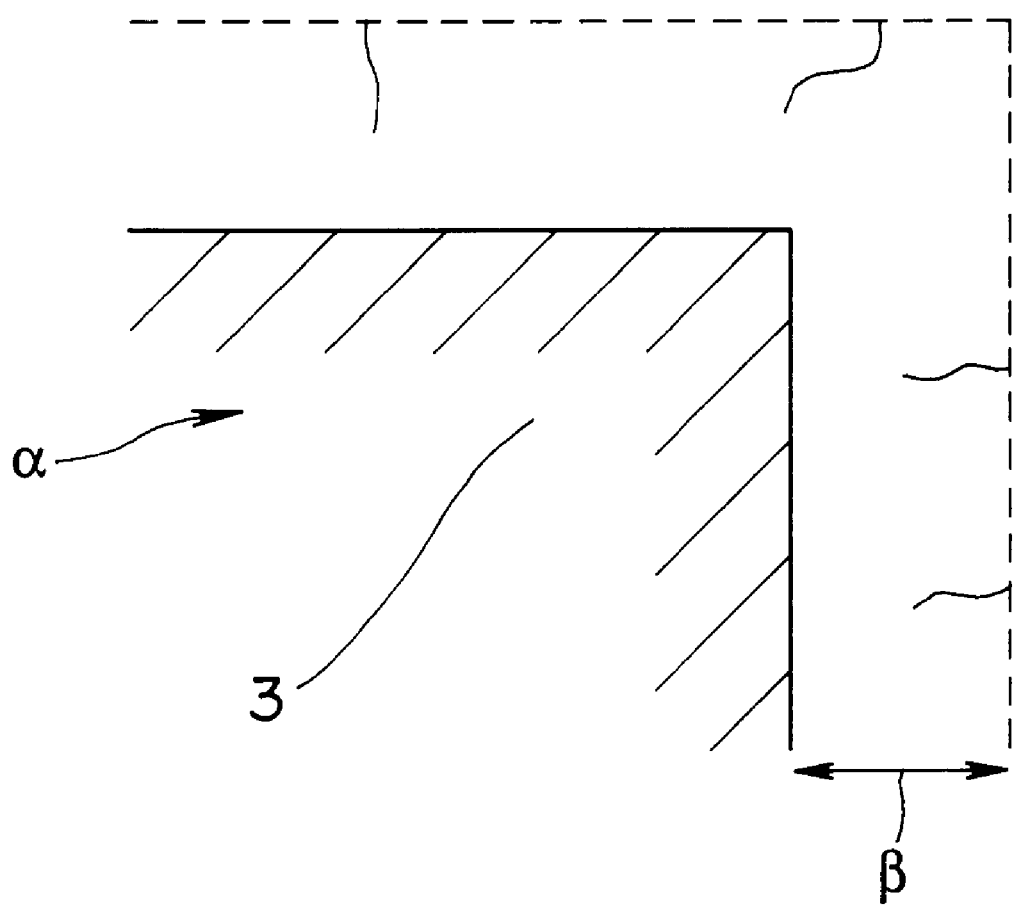
FIG. 4 is an enlarged fragmentary section showing a zone α in FIG. 3H.

Further, with the method of manufacturing power rollers according to the present invention, since the cylindrical material 21 is subjected to carburizing or carbonitriding as shown in FIG. 3C so as to form the hardened layer having the thickness of 1–2 mm, which is then subjected to axial pressure forging and die forging as shown in FIGS. 3D and 3E so that the hardened layer thickness $d_1$ of the ball receiving side wall 3c is thinner than the hardened layer thicknesses $d_2, d_3$ of the power roller outer peripheral surface 3a and central axial hole inner peripheral surface 3b, the above carburizing or carbonitriding of the cylindrical material 21 may be shallow, shortening a duration of the heat treatment, resulting in no deep development of an intergranular oxidizing zone β which often causes a crack as shown in FIG. 4. Thus, the intergranular oxidizing zone β can completely be eliminated through the above grinding finishing which ensures cutting of a portion from a broken line to a solid line as shown in FIG. 4. Elimination of the intergranular oxidizing zone β is also carried out when it is rubbed with the upper and lower dies 22, 23 during die forging as shown in FIG. 3E.

When the hardened layer thickness $d_2$ of the power roller outer peripheral surface 3a is more than 4 mm, the intergranular oxidizing zone β tends to be too thick to be eliminated even through the above grinding finishing. With the power roller 3 according to the present invention, the hardened layer thickness $d_2$ of the power roller outer peripheral surface 3a is less than 4 mm, solving such inconvenience.

Experiments revealed that, when the hardened layer thickness obtained through carburizing or carbonitriding as shown in FIG. 3C is less than 1 mm, the power roller outer peripheral surface 3a and the ball receiving side wall 3c receive a rolling fatigue under high bearing pressure, decreasing the safety factor with respect to the depth of occurrence of the maximum shearing stress, resulting in excessive lowering of the rolling fatigue life of the power roller 3. Experiments also revealed that, when the hardened layer thickness obtained through carburizing or carbonitriding as shown in FIG. 3C is more than 2 mm, a crack is apt to occur during pressure forging and die forging as shown in FIGS. 3D and 3E, and that, when the forging ratio upon pressure forging or die forging is more than 2, the thickness of the effective hardened layer of a rolling surface of the power roller 3 is more than 4 mm, causing an early occurrence of fatigue or impact crack at the confluence α as shown in FIG. 3H.

Experiments also revealed that, when the hardened layer thickness obtained through carburizing or carbonitriding as shown in FIG. 3C is more than 2 mm, a duration of heat treatment is lengthened to cause increased intergranular oxidizing zone β, resulting in impossible restraining thereof within the thickness which can be eliminated by cutting during grinding finishing.

Still further, with the method of manufacturing power rollers according to the present invention wherein carburizing or carbonitriding as heat treatment is carried out prior to pressure forging and die forging, austenite grains in the hardened layer made fine through pressure forging and die forging are not enlarged through subsequent heat treatment, having a small size, i.e. the grading number of 8 or more, increasing the toughness of the hardened layer, resulting in improved impact strength and bending fatigue strength thereof. Experiments revealed that austenite grains in the hardened layer with the grading number of 7 or less are too large in size, resulting in excessive lowering of the impact strength and the bending fatigue strength of the hardened layer.

Still further, with the power roller 3 according to the present invention, since the thickness $d_1$ of the carburized or carbonitrided layer portion on the ball receiving side wall 3c extending radially is thinner than the thicknesses $d_2, d_3$ of the carburized or carbonitriding layer portions on the power roller outer peripheral surface 3a and central axial hole inner peripheral surface 3b extending axially, a confluence of the ball receiving side wall 3c and the central axial hole inner peripheral surface 3b which should be the most durable in view of the strength of the power roller 3, i.e. a zone α as shown in FIG. 3H is formed with a soft core, which contributes to an increase in the durability thereof, resulting in largely improved durability of the power roller 3.

Furthermore, with the power roller 3 according to the present invention, since the carburized or carbonitrided layer having the thickness $d_1$ of 1–2 mm is placed on the ball receiving side wall 3c, and the carburized or carbonitrided layer having the thickness $d_2$ of 2–4 mm is placed on the power roller outer peripheral surface 3a which contacts the input and output discs 1, 2, the rolling fatigue of the power roller 3 can be avoided which occurs when the hardened layer thickness $d_2$ of the power roller outer peripheral surface 3a is less than 2 mm, and the hardened layer thickness $d_1$ of the ball receiving side wall 3c is less than 1 mm, increasing the safety factor with respect to the depth of occurrence of the maximum shearing stress, resulting in lengthened life of the power roller 3 in view of rolling fatigue. Moreover, since the hardened layer thickness $d_2$ of the power roller outer peripheral surface 3a is less than 4 mm, a confluence of the power roller outer peripheral surface 3a and the ball receiving side wall 3c presents the same operation and effect as that one at the confluence α, increasing the durability thereof, resulting in further improvement of the durability of the power roller 3.

Further, with the power roller 3 according to the present invention, since the fiber flow 21b extends axially along the power roller outer peripheral surface 3a without a break as shown in FIG. 3H, then radially inwardly along the ball receiving side wall 3c without a break, i.e. no disconnected portion of the fiber flow 21b is found in the power roller outer peripheral surface 3a and the ball receiving side wall 3c, the breakaway and fatigue or impact crack which are apt to start from the disconnected portion of the fiber flow 21b can be prevented even with the input and output discs 1,2 being engaged with the power roller outer peripheral surface 3a, and the ball 8 rolling on the ball receiving side wall 3c.

Having described the present invention in connection with the preferred embodiment, it is noted that the present invention is not limited thereto, and various changes and modifications can be made without departing from the spirit of the present invention.

What is claimed is:

1. In a continuously variable transmission, including input and output discs and a traction roller which transmits power between the discs, a supporting member, during power transmission, for rotatably supporting a load on the traction roller about a central axial hole of the traction roller by a rolling element interposed between a side wall of the traction roller and the supporting member, the traction roller comprising:

a first hardened layer formed on the side wall of the traction roller, said first layer having a first thickness;

a second hardened layer formed on a central axial region of the traction roller, said second layer having a second thickness, wherein said first thickness along the side wall is less than the second thickness of the layer along the axial region of the traction roller.

2. In a continuously variable transmission as claimed in claim 1, wherein said first to second layers are obtained by one of carburizing and carbonitriding.

3. In a continuously variable transmission as claimed in claim 2, wherein said first through second layers include austenite grains with a grading number of 8 or more.

4. In a continuously variable transmission, wherein said first thickness of said first layer is 1–2 mm.

5. In a continuously variable transmission as claimed in claim 1, wherein said second thickness of said second layer is 2–4 mm.

6. In a continuously variable transmission as claimed in claim 1, wherein a fibrous structure is formed in the traction roller in which a fibrous flow of material grain along the axial direction continuously extends radially inwardly.

7. In a continuously variable transmission as claimed in claim 6, wherein said fibrous flow continuously extends inwardly as viewed in a radial direction of the traction roller along the side wall thereof.

8. In a continuously variable transmission as claimed in claim 1, the traction roller further comprising:

a third hardened layer formed on an outer peripheral surface of the traction roller, said third layer having a third thickness, wherein
the first thickness along the side wall is less than the thickness of the third layer.

9. In a continuously variable transmission as claimed in claim 8, wherein the first through third layers are obtained by one of carburizing and carbonitriding.

10. In a continuously variable transmission as claimed in claim 1, wherein the roller element includes a plurality of balls and the traction roller has an annular raceway for receiving the balls, the traction roller further comprising a raceway formed on the side wall for receiving the balls.

11. In a continuously variable transmission, including input and output discs and a traction roller which transmits power between the discs, a supporting member, during power transmission, for rotatable supporting a load on the traction roller about a central axial hole of the traction roller by a rolling element interposed between a side wall of the traction roller and the supporting member, the traction roller comprising:

first means for covering the side wall of the traction roller, said first means being hardened and having a first thickness;

second means for covering a central axial region of the traction roller, said second means being hardened and having a second thickness, wherein said first thickness along the side wall is less than the second thickness of the means along the axial region of the traction roller.

12. In a continuously variable transmission as claimed in claim 11, wherein said first to second means are obtained by one of carburizing and carbonitriding.

13. In a continuously variable transmission as claimed in claim 12, wherein said first through second means include austenite grains with a grading number of 8 or more.

14. In a continuously variable transmission as claimed in claim 11, wherein said first thickness of said first means is 1–2 mm.

15. In a continuously variable transmission as claimed in claim 11, wherein said second thickness of said second means is 2–4 mm.

16. In a continuously variable transmission as claimed in claim 11, wherein a fibrous structure is formed in the traction roller in which a fibrous flow of material grain along the axial direction continuously extends radially inwardly.

17. In a continuously variable transmission as claimed in claim 16, wherein said fibrous flow continuously extends inwardly as viewed in a radial direction of the traction roller along the side wall thereof.

18. In a continuously variable transmission as claimed in claim 11, the traction roller further comprising:

a third means for covering an outer peripheral surface of the traction roller, said third means being hardened and having a third thickness, wherein
the first thickness along the side wall is less than the thickness of the third means.

19. In a continuously variable transmission as claimed in claim 18, wherein the first through third means are obtained by one of carburizing and carbonitriding.

20. In a continuously variable transmission as claimed in claim 11, wherein the roller element includes a plurality of balls and the traction roller has an annular raceway for receiving the balls, the traction roller further comprising a raceway formed on the side wall for receiving the balls.

* * * * *